Oct. 3, 1967  J. ULICKI  3,345,104
HORSE TRAILER
Filed Sept. 17, 1965
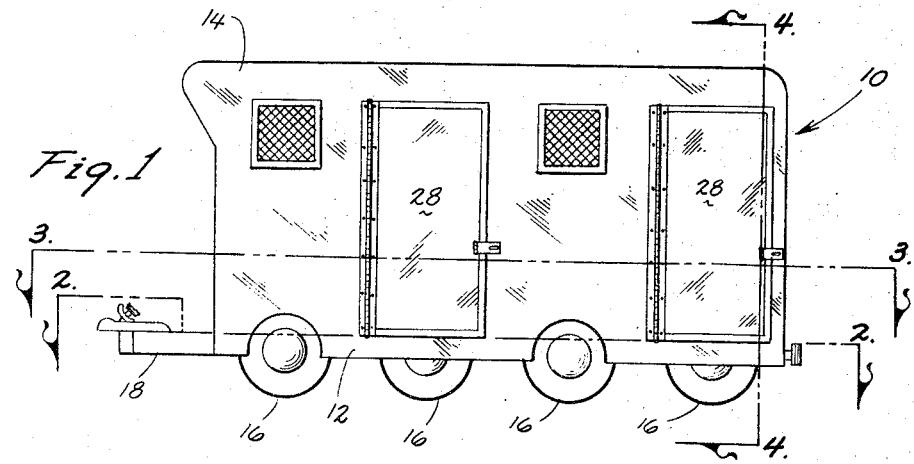
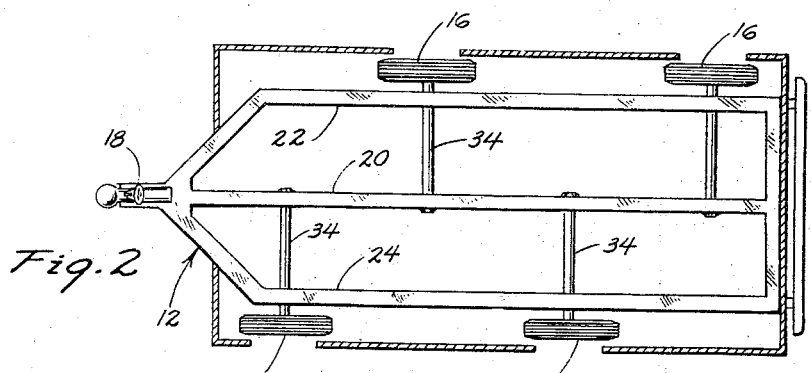
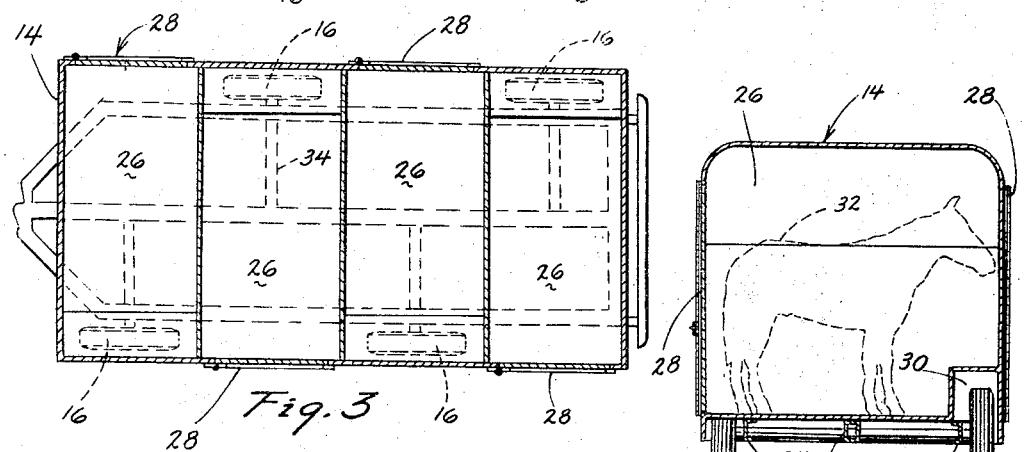
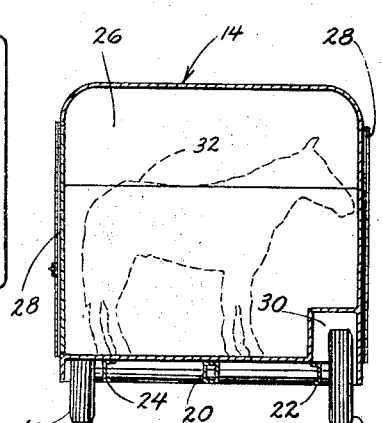
INVENTOR
JOHN ULICKI
BY Dick, Zarley, McKee & Thomte
ATTORNEYS

United States Patent Office 3,345,104
Patented Oct. 3, 1967

3,345,104
HORSE TRAILER
John Ulicki, Rte. 1, Fort Dodge, Iowa 50501
Filed Sept. 17, 1965, Ser. No. 488,136
7 Claims. (Cl. 296—24)

This invention relates to an improved animal trailer and in particular to a trailer having animal compartments which are transversely arranged relative to the travel path of the trailer.

Conventional animal trailers and in particular horse trailers are constructed to hold a maximum of two horses disposed in side by side relationship in compartments extending lengthwise of the trailer. Additional compartments are not normally provided in these trailers since it is not convenient to reach the interior of the compartments if they are arranged end to end since it would be necessary to pass through one compartment to reach the next compartment adjacent the end of the first compartment. Also it is to be understood that in conventional trailers it is necessary to enter from the rear of the trailer since normally there is a tongue or hitch on the front end of the trailer which makes it impractical to enter the trailer from that end.

Therefore, it is a principal object of this invention to provide a trailer having a plurality of compartments all of which are readily accessible.

It is a further object of this invention to provide a trailer wherein the animal compartments are arranged transversely to the longitudinal axis of the trailer and to the line of travel of the trailer.

It is a still further object of this invention to provide a trailer having a plurality of animal compartments with the doors of adjacent compartments being disposed on opposite sides of the trailer.

A still further object of this invention is to provide an animal trailer having transversely disposed compartments arranged relative to the longitudinal axis of the trailer in parallel relationship to the wheel support axes.

A still further object of this invention is to provide an animal trailer wherein animal compartments are arranged transversely of the line of travel of the trailer and on each side of the trailer there are alternately disposed support wheels and compartment doors.

A still further object of this invention is to provide an animal trailer wherein animal compartments are transversely arranged relative to the line of travel of the trailer and support wheels are staggered lengthwise of the trailer on opposite sides thereof with the wheels being disposed in wells formed in the compartments at the ends of the compartments opposite the compartment doors.

A further object of this invention is to provide an animal trailer which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side elevational view of the animal trailer of this invention;

FIG. 2 is a cross-sectional view taken along line 2—2 in FIG. 1 and showing in particular the staggered relationship of the wheels on opposite sides of the trailer;

FIG. 3 is a cross-sectional view taken along line 3—3 in FIG. 1 and showing in particular the staggered relationship of the wheels and their relationship to the transversely extending animal compartments wherein the wheels are disposed at the ends of the compartments opposite the compartment doors; and FIG. 4 is an elevational cross-sectional view taken along line 4—4 in FIG. 1.

The trailer of this invention is referred to generally in FIG. 1 by the reference numeral 10 and is shown to include a frame 12 having a body 14 mounted thereon. A plurality of wheels 16 are secured to the frame 12 and disposed under the body 14. A tongue and hitch assembly 18 are provided on the forward end of the frame 12.

Frame 12 includes longitudinally extending center and side portions 20, 22 and 24 respectively as seen in FIG. 2. The body 14 is divided into a plurality of compartments 26 transversely arranged relative to the longitudinal axis of the trailer and its line of travel. As seen in FIG. 3, the compartments 26 are disposed in parallel relationship to the axes of rotation of the wheels 16. Each of the compartments 26 are provided with access doors 28 as seen in FIG. 1 which are remotely spaced from the wheels 16.

As seen in FIG. 3, each side of the trailer is shown to include alternately a wheel 16, a door 28 and another wheel 16. The length of the trailer accordingly could be as long as desired. It is seen that the wheels 16 are disposed directly opposite the doors 28 and turn in wells 30 which are formed by the interior wall construction of the compartments 26 and are disposed at the ends of the compartments 26 opposite the doors 28.

Accordingly, a horse 32 may be conveniently positioned in the compartments 26 with his head over the wheel wells 30. Moreover, a storage area is provided on top of the wheel wells 30 wherein feed or the like may be placed.

As further seen in FIGS. 2 and 3, the wheels 16 are mounted on axles 34 which extend only half the width of the trailer 10 and accordingly are secured to the center frame portion 20 and the adjacent frame portion 22 or 24.

Thus it is seen that maximum utilization of all space is accomplished by the trailer construction shown and described. Furthermore, each animal compartment 26 is readily usable since the access doors 28 are conveniently arranged lengthwise along the trailer sides. Moreover, any number of animal compartments may be included depending on the length of the trailer.

Some changes may be made in the construction and arrangement of my horse trailer without departing from the real spirit and purpose of my invention, and it is my intention to cover by my claims, any modified forms of structure or use of mechanical equivalent which may be reasonably included within their scope.

I claim:
1. An animal trailer, comprising,
    an elongated frame having a hitch means at one end for engagement with a leading vehicle,
    a body on said frame and having a plurality of side by side transversely extending animal compartments, said body having a door for each of said compartments, and the door for adjacent compartments being on opposite sides of said body, and a plurality of support wheels mounted under said body and to said frame, and said wheels extend into adjacent compartments at the opposite ends of said compartments from said doors.

2. The structure of claim 1 wherein said plurality of wheels includes successive wheels lengthwise along said frame alternately disposed on opposite sides of a substantial length of said frame.

3. The structure of claim 1 wherein said plurality of wheels includes adjacent wheels lengthwise along said frame alternately disposed on opposite sieds of a substantial length of said frame whereby said doors on each side of said body are spaced apart and sparated by one of said wheels.

4. The structure of claim 1 and said frame is further defined as having longitudinally extending center and opposite side portions, and an axle for each wheel, each of said axles extending only from one of said side portions to said center portion.

5. The structure of claim 1 and a window is formed in the endwall of each compartment opposite the door for said compartment and over a support wheel.

6. The structure of claim 1 wherein the walls of said compartments are formed to cover over said wheels and provide a storage area.

7. The structure of claim 1 wherein the axis of rotation of said wheels are parallel to the longitudinal axes of said animal compartments.

References Cited
UNITED STATES PATENTS

| | | | |
|---|---|---|---|
| 114,795 | 5/1871 | Fox | 119—11 |
| 844,615 | 2/1907 | Palmer | 180—21 |
| 1,607,236 | 11/1926 | Bumstead | 180—21 |
| 2,551,207 | 5/1951 | Ensor | 296—23 |
| 3,053,224 | 9/1962 | Pierce. | |

BENJAMIN HERSH, *Primary Examiner.*

P. GOODMAN, *Assistant Examiner.*